(No Model.)

T. L. WILSON.
RAILWAY CAR.

No. 293,608.    Patented Feb. 12, 1884.

Witnesses.
W. J. Graham
Charles C. Baldwin

Inventor.
Thos. L. Wilson.
by Donald C. Ridout & Co.
Attys.

UNITED STATES PATENT OFFICE.

THOMAS L. WILSON, OF PORT HOPE, ONTARIO, ASSIGNOR OF ONE-HALF TO AUSTIN D. CABLE, OF MONTREAL, CANADA.

RAILWAY-CAR.

SPECIFICATION forming part of Letters Patent No. 293,608, dated February 12, 1884.

Application filed January 2, 1884. (No model.)

*To all whom it may concern:*

Be it known that I, THOMAS LAVERICK WILSON, of the town of Port Hope, in the county of Durham, in the Province of Ontario, Canada, master car-builder, have invented certain new and useful Improvements in Railroad-Cars; and I do hereby declare that the following is a full, clear, and exact description of the same.

The object of the invention is to devise a simple, cheap, and effective contrivance for preventing the truck of a car slewing more than is necessary for curving, which contrivance performs the additional service of a hold-fast to prevent the body of the car leaving the truck in the event of derailment.

Figure 1:
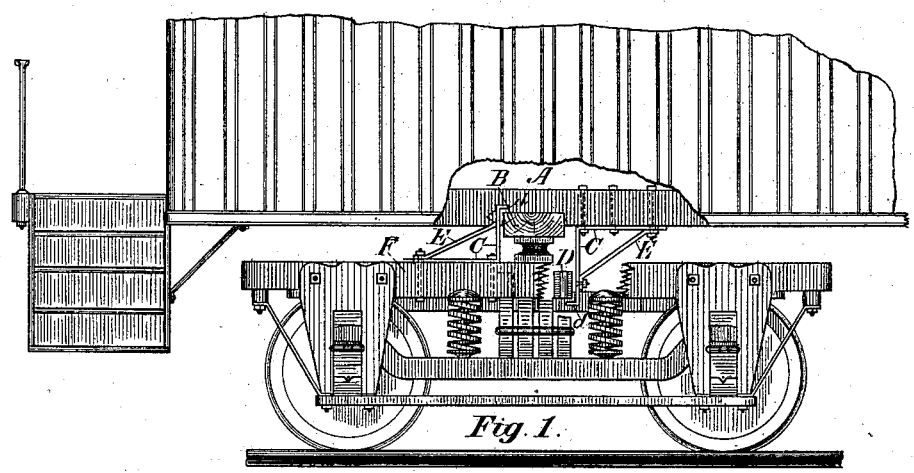
Figure 2:
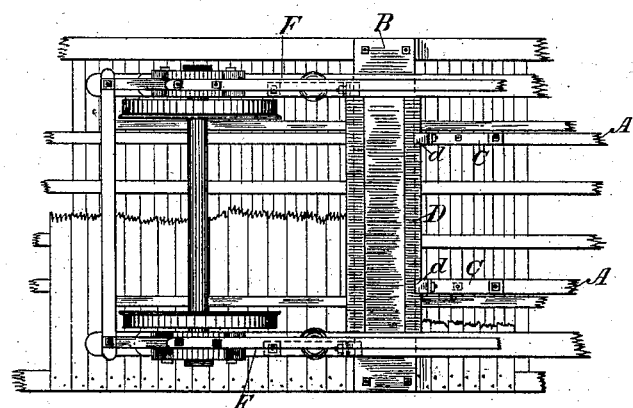
Figure 4:
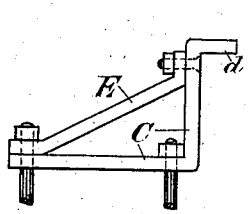
Figure 3:
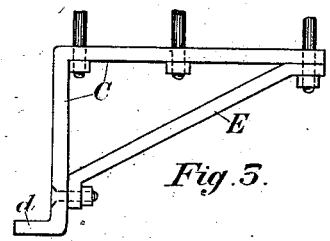

Figure 1 is a side view, showing a truck provided with my improved safety-truck lock, a portion of the side of the car being broken away to show the device. Fig. 2 is a bottom view, showing a portion of the truck and longitudinal timbers of the bottom framing of the car, and showing the position of the locking device. Fig. 3 is a detail showing the form of the bracket used for locking the longitudinal timber of the car to the transom of the truck. Fig. 4 is a detail showing the bracket for locking the truck side timbers to the body-bolster of the car.

On the 15th of May, 1883, I obtained Letters Patent of the United States No. 277,819, in which I describe a device designed to accomplish, in a measure, the advantages secured by my present invention. In that device I show a series of brackets bolted to the longitudinal timbers of the car, and to a boiler-plate extending across the car between the outer transom and timbers of the truck. On this boiler-plate are also bolted two or more brackets designed to extend below the transom of the truck. This device was expensive in construction, and was not as effective as the invention now presented.

I am aware of American Patents Nos. 104,580, 173,257, 182,455, and 227,792, which patents describe devices applied to cars which prevent the trucks oscillating, but in none of them is there a truck-lock shown which accomplishes the effect of my invention. It is essential that the brackets forming the truck-lock constructed in accordance with my invention should be strongly braced, so as to resist the severe strain caused by the truck striking against them in the event of derailment. It is essential that they should be located at the proper points to produce the desired effect, and that they shall be light in form and cheap in construction, to enable their general adoption.

A are the intermediate longitudinal timbers of the body of the car.

B is the body-bolster of the car, bolted in position in the ordinary manner.

C is an angle-bracket bolted to the bottom of the intermediate longitudinal timber, A. It will be noticed that the angle-bracket C is bolted one to each of the intermediate longitudinal timbers, A, and that one of the arms of each bracket extends downwardly to a point behind the truck-transom D, and that on the lower end of this downwardly-projecting arm a flange or lip, $d$, is formed, so as to project below the bottom of the truck-transom D. It will further be noticed that a small space is left between the downwardly-projecting arm of the angle-bracket C and the back of the truck-transom D, and that a corresponding space is left between the flange $d$, which projects below the bottom of the said transom. These spaces are calculated so as to leave sufficient play for the ordinary curving of the car, and for the motion of the carrying-springs.

A diagonal brace, E, extending from a point near the bottom of the downwardly-projecting arm of the angle-plate $C$, to a point near the end of the arm of the said bracket, which is bolted to the intermediate longitudinal timber, A, constitutes a diagonal brace capable of withstanding the greatest strain possible to be directed against the downwardly-projecting arm of the angle-bracket in the event of the truck leaving the track and coming in contact with the said arm. As there is sufficient play left between the bracket and the transom for the ordinary motion required by the truck in curving, the brackets, when in their position, will not in any way interfere with the curving of the trucks; but in the event of derailment, instead of the truck slewing toward a right angle to the track, it will come in contact with either one or the other of the angle-brackets C before it has had an opportunity of slewing sufficiently to carry the car away from the track. Should the truck leave the right-hand side of the track, it will immediately come in contact with the angle-brackets C fastened to the intermediate longitudinal timber located at the right-hand side of the car. When striking this timber, the truck will naturally be thrown in the opposite direction, imparting to it an inclination to keep parallel with the rail, the wheels coming in contact simultaneously with the same tie, not being permitted to slew sufficiently so that the wheel on one side of the truck shall be in a space ahead of the wheel on the other side. Consequently a truck provided with my improved safety-truck lock cannot leave the track sufficiently to ditch the car, and as the flange $d$ projects below the bottom of the truck-transom D, it is impossible for the body of a car provided with my angle-brackets to jump from the truck. In order to still further secure the end of my invention, I provide an additional safety-lock formed by similarly-shaped angle-brackets C bolted to the top side of the truck side timbers. These brackets are provided with flanges $d$, similar to those formed on the end of the brackets bolted to the intermediate longitudinal timbers, A. These flanges are designed to project above the body-bolster B of the car, and are intended to accomplish the same end as the flanges $d$ formed on the brackets attached to the intermediate longitudinal timbers of the car—namely, to prevent the body of the car jumping from the truck. It will further be noticed that the brackets C bolted to the side timbers, F, of the truck are located outside of the body-bolster B, so that the truck may be withdrawn from the car without detaching the brackets. The brackets C which are bolted to the side timbers, F, are provided with similar diagonal braces, E, for the purpose of strengthening the said angle-brackets.

When my improved truck-lock is applied to an engine-truck, instead of bolting the brackets C to the intermediate timbers, which would be impossible in an engine, I bolt them to the bed-plate of the cylinder or the engine-frame, the flanged end $d$ of each bracket projecting below the iron frame of the engine-truck, which answers the same end as the transom of a truck, the cylinder-bed casting answering the same purpose as the intermediate timbers, the position of the brackets being the same relative distance from the wheels as though they were bolted to the intermediate timbers.

What I claim as my invention is—

1. The combination, with the intermediate longitudinal timbers, A, of angle-brackets C, one arm of each being bolted to its respective intermediate timber, A, while the other arm extends downwardly behind the truck-transom D, and is provided with a flange, $d$, to project below the bottom of the said transom, and a diagonal brace, E.

2. The combination, with the side timbers, F, of a truck, of angle-brackets C, bolted to the top side of the said timbers F, as specified, provided with a flange, $d$, to project over the body-bolster B of the car, and with a brace, E, substantially as and for the purpose specified.

Toronto, December 15, 1883.

THOS. L. WILSON.

In presence of—
CHARLES C. BALDWIN,
F. BARNARD FETHERSTONHAUGH.